INVENTOR.
Mario Cavicchioli
BY Leonard H. King
ATTORNEY

Feb. 20, 1973   M. CAVICCIOLI   3,717,159
POT WASHER AND STERILIZER
Filed July 28, 1971   2 Sheets-Sheet 2

INVENTOR.
Mario Cavicchioli
BY
Leonard H. King
ATTORNEY

United States Patent Office 3,717,159
Patented Feb. 20, 1973

3,717,159
POT WASHER AND STERILIZER
Mario Cavicchioli, 164 Vanderbilt Ave.,
Island Park, N.Y. 11558
Filed July 28, 1971, Ser. No. 169,568
Int. Cl. B08b 3/02
U.S. Cl. 134—58 DL                                8 Claims

ABSTRACT OF THE DISCLOSURE

A soaking station, a scraping station, a washing station, and a sterilizing station for pots and pans are arranged generally in a line. Each station comprising a detachable independent assembly which may be selectively chosen in accordance with the predetermined functions to be performed. The basic assembly is a soaking station which includes a sink for soaking pots and pans containing adhering refuse. The addition of a scraping station provides a convenient area for storing and scraping cooking utensils containing adherent refuse. A washing station includes a second sink and provides agitation and washing structure for removing any remaining refuse from the utensils. The addition of a sterilizing station provides for sterilizing the utensils with live steam and, if desired, provides for a hot and cold rinse.

BACKGROUND OF THE INVENTION

The present invention relates to an apparatus for washing and sterilizing cooking utensils and more specifically to an apparatus for washing and sterilizing pots and pans which comprises several independent selectable assemblies chosen in accordance with the functions to be performed.

Although the invention of automatic dishwashing means has solved many of the problems associated with serving meals, one major problem remains. This problem relates to the proper cleaning and sterilizing of the cooking utensils such as pots and pans associated with preparing large numbers of meals. Although automatic dishwashing machinery has been found to adequately wash and sterilize dishes, they have been found unsuitable for the peculiar and dissimilar cleaning problems associated with the cleaning of cooking utensils and, in particular, metallic pots and pans. Food material referred to as refuse, clinging to the bottom and walls of the pots and pans, after the edible food has been removed, usually can not be removed by mere washing or spraying with hot water or a steam spray. The refuse adheres to the walls and bottom of the pots and pans during the food cooking cycle. Automatic means, similar to that provided for dishwashing, have proven unsatisfactory for cleaning metal cooking utensils in use today.

SUMMARY OF THE INVENTION

The preferred embodiment of the present invention provides a non-automatic convenient means for removing the refuse adhering to cooking utensils by an attendant using several stations; each station is selected for the function to be performed. The apparatus includes several stations which may be individually selected for each installation.

In accordance with the principles of the present invention, a pot and pan washer and sterilizer apparatus is provided having several selectable stations arranged generally in a line from right to left and adapted to be connected to a source of hot and cold water and steam. The system comprises a soaking means including a first sink having hot water therein, for soaking the pots and pans, a scraping station cooperating with and adjacent to the soaking means including a V-shaped drainboard inclined toward the sink for resting the pots and pans while being scraped by an attendant. The apparatus further comprises washing means, including a second sink, first and second fixed spray nozzles, a removable refuse tray and a recirculating pump for spraying hot water and recirculated water in response to attendant activated means for washing the pots and pans and accumulating the refuse, and sterilizing means having a sealable chamber with an access door, providing a steam spray in all directions within the chamber for sterilizing the pots and pans. The sterilizing chamber further including drain means for removing condensing steam.

DESCRIPTION OF THE PREFERRED EMBODIMENT OF THE INVENTION

Figure 1:
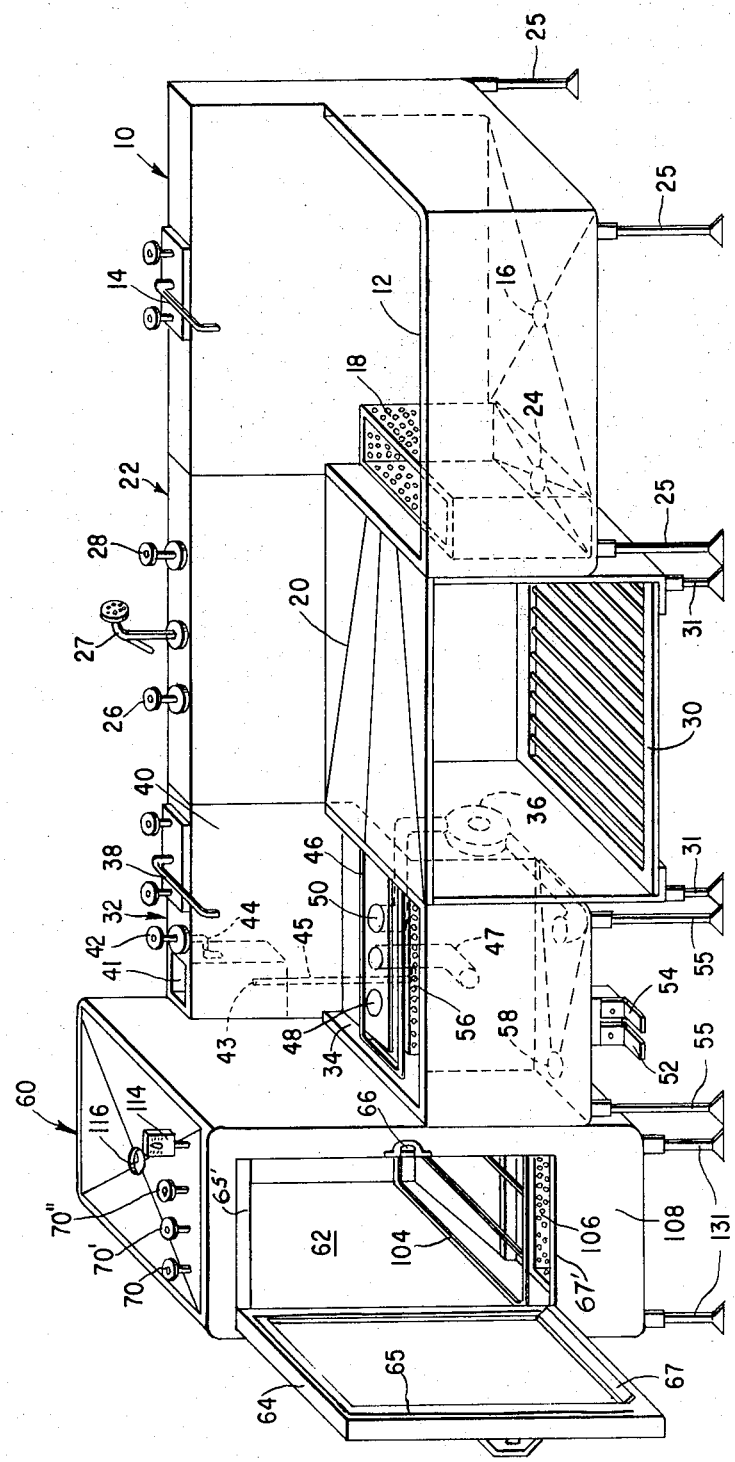
FIG. 1 is a perspective view of the basic stations utilized in the preferred embodiment of the present invention.

The soaking station 10, shown in FIG. 1, includes a sink 12, which is provided with a hot and cold water faucet 14, adapted to be connected to a source of hot and cold water, not shown. At the bottom of sink 12 is a drain 16 which is connected to a conventional drain pipe through a trap, not shown. A portion of the sink 12 along the left side, is occupied by a perforated refuse catch basket 18 adapted to cooperate with the V-shaped drain board 20 of the scraping station 22, which is normally mounted alongside the sink 12. The catch basket 18 retains the refuse while permitting the fluids to flow toward the drain 16, alternatively, or the sink 12 may be provided with an auxiliary drain outlet 24 beneath the refuse basket 18. Legs 25 are of the adjustable type and permit leveling the sink at a height convenient for the attendant while supporting the sink.

The scraping station 22 is provided with a flexible pull-out spray 27 which contains its own on-off valve as well as hot 26 and cold 28 water regulating valves to set the temperature of the water at the spray head 27. A tubular grated slide out storage shelf 30 is provided beneath the drain board 20 to store the pots and pans and other cooking utensils awaiting washing and sterilizing. Legs 31 are adjustable and are provided to level the scraping station at a convenient height.

Adjacent to the scraping station 22 is the washing station 32, which includes a sink 34 with a recirculating pump 36 mounted in the lower portion thereof. The sink 34 is provided with a faucet 38 which is adapted to be connected to a source of hot and cold water (not shown).

Figure 2:
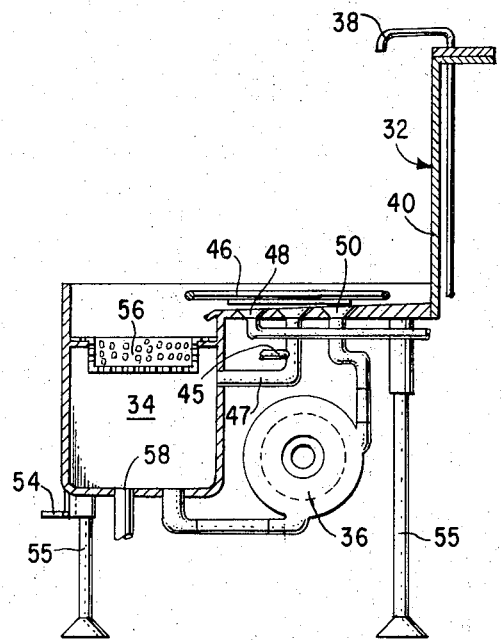
FIG. 2 is a partially sectioned side view taken in elevation of the washing station.

A tubular rack 46 is provided across the full width of the sink 34, shown in detail in FIG. 2, which is used for resting the pots and pans while washing. Located beneath the rack 46 are two fixed spray heads 48 and 50. Spray head 48 is adapted to be connected to a source of hot water, not shown, via foot pedal valve 52 located beneath the sink 34 near the floor. Spray head 50 is adapted to spray the water within the sink 34 when foot pedal 54 is depressed, receiving its pressure from the recirculating pump 36. As a safety means it is desirable to hinge the pedal so that it may be folded out of the way when not used. Mounted beneath the spray head 48 and 50 within the confines of rack 46 is a removable perforated refuse tray 56, which retains any refuse released by the water sprays while permitting the water to flow into the sink area. The sink 34 is also provided with a drain 58 which is connected to a conventional drain pipe and is used for draining the water when it becomes dirty. Legs 55 are provided to support the sink and are adjustable to level the sink at a convenient height.

Mounted in the rear wall 40 of sink 34 is a detergent dispenser 41 having an output port 43 with a hose 45 therein, extending into the water area of the sink 34. A valve 42, which is adapted to be connected to a source of water, not shown, in connected by means of a hose 44 to the valve 42. The valve 42 is adjusted to allow water to flow into the detergent dispenser 41 at a slow rate, thereby permitting it to mix with the detergent and flow out of the output port via tube 45 into the sink 34. Tube 45 preferably feeds into bypass waste pipe 47, which receives a portion of the waste water from spray heads 48 and 50 to further the distribution of detergent for more efficient utilization. Further, should tray 56 become completely blocked, then waste 47 serves as a safety means. A conventional strainer is used at the opening of pipe 47.

Figure 3:
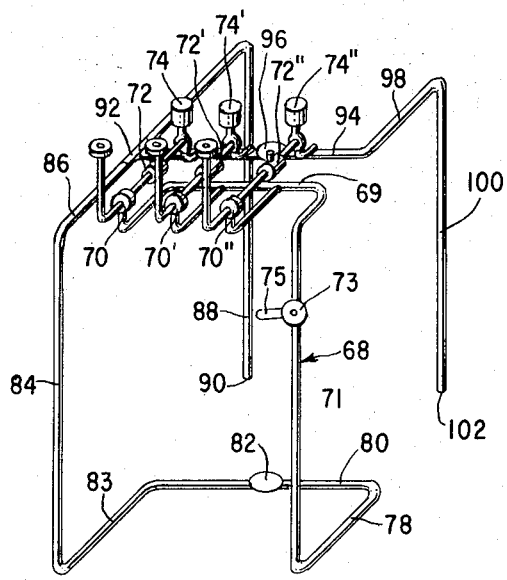
FIG. 3 is a perspective view of the piping and spray means mounted within the sealable chamber of the sterilizing means.

The sterilizing station 60 is provided with a sealable chamber 62 which has an access door 64 located on the front wall. The access door 64 is preferably of a double shell construction and has incorporated therein a rubber gasket 65 which seats against ledge 65' to insure a seal when the door is closed and retained by latch 66. Ledge 65' extends along the sides and top. However, in FIG. 1 only the top portion is visible. Lip 67 directs run-off from the door inner wall into basket 106. Catch drip gutter 67' directs drippings, condensation etc., from the outer door surface into the chamber. In the upper portion of the sealable chamber 62, the tubular spraying apparatus 68 shown in FIG. 3 is fixedly mounted. The tubular spraying apparatus 68 is adapted to be connected at its upper portion 69 to a source of hot and cold water and source of steam, not shown, via similar right angle valves 70, check valves 72, and a vacuum breaker 74. The similar right angle valves are shown as 70' and 70", the similar check valves are shown as 72' and 72", and the similar vacuum breakers are shown as 74' and 74". The upper portion 69 of the spraying apparatus 68 extends across to top of the chamber 62 providing a common feed for the hot and cold water and steam. The tubular spraying apparatus 68 has a vertical section 71 extending downwardly and including a safety valve 73. The safety valve 73 is arranged to cooperate with the access door 64 so that the door 64 moves the actuating lever 75 of the valve 73 only when the door is firmly closed and latched by latch 66. This prevents the water and steam from flowing in the spraying apparatus 68 if the door 64 is left open even if the water valves 70, 70' and 70" have been left open.

The vertical section 71 extends rearwardly 78 and then horizontally 80 across the back of the chamber. The rear horizontal section 80 includes a fixed spray head 82 to insure adequate coverage of the steam and water. The rear horizontal section 80 extends in a forwardly direction 83 at the end of the chamber 62 and then in a vertical direction 84 until it reaches the upper section of the chamber where it extends rearwardly 86 in a horizontal direction until it reaches the rear of the chamber where it extends downwardly in a vertical direction 88 where it ends and is provided with a removable end plug, 90. In the center of section 86, a T connection 92 is provided wherein a horizontal tubular section 94 extends across the chamber. Included in the center of section 94 is an additional spray head 96. The tubular section 94 then continues rearwardly 98 to the rear of the chamber and then downwardly in a vertical direction 100 until it approaches the lower section 80 where it is terminated and provided with an end seal 102. All of the tubular sections are perforated about the circumference thereby providing a spray which covers all areas of the sealable sterilizing chamber 62.

Figure 4:
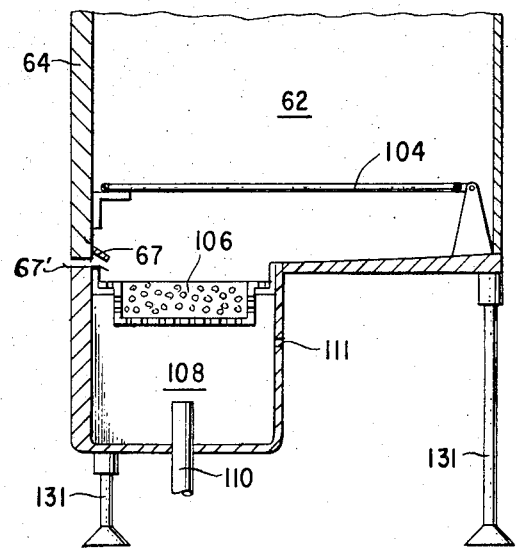
FIG. 4 is a partially sectioned side elevational view of the sterilizing chamber.

The lower portion of chamber 62 contains a hinged rack 104 (FIG. 4) upon which the pots and pans that are to be sterilized and given a final rinse may be mounted. Beneath the hinged rack 104 is mounted a perforated refuse tray 106, which is easily removable, and is used to capture any remaining refuse which becomes dislodged from the pots and pans during the final sterilizing cycle. Beneath the tray is a small sink 108 which is provided with a stand pipe drain 110 which is connected to a conventional drain pipe for disposing of condensed steam and water. Weep holes 111 above the level of the stand pipe are provided in accordance with the usual sanitary codes.

Included on the outer top wall of the sterilizing station 60 is a timer 114 which is manually adjustable and provides an audible signal for the attendant to inform him when the sterilization cycle time is completed. Section 62 is mounted on adjustable legs 131.

The material used in the preferred embodiment of the invention for all water exposed surfaces is stainless steel. This material is selected for its ease in maintenance, long wearing qualities and non-reaction with detergents.

Although the preferred embodiment is shown to include four separate stations mounted in a line it is to be understood that the stations may be used separately and any number of the stations can be combined and used. The type and number of stations to be used depends on the particular functional needs.

In operation, the cooking utensils are brought to an attendant and stored on the removable tray 30. The attendant then removes a utensil, places it on the drain board 20 and removes remaining refuse by hand, assisted by an abrasive such as steel wool or the like, and the flexible spray head 27. The excess water and refuse flows toward refuse basket 18, which may be easily removed to dispose of the accumulated refuse when full. The utensil is then placed into the sink 12, which has been filled with water, to soak off and loosen remaining refuse, while the attendant works on the next utensil. Whether the utensil is soaked or scraped first depends upon the option of the attendant. After soaking, a second scraping may be necessary for some utensils. The utensil is then placed on rack 46 above spray heads 48 and 50 where it is further subjected to the spray from spray heads 48 and 50 which are activated by the attendant by applying pressure to foot pedals 52 and 54. The utensil may also be dipped into the agitated water in sink 34 alternately with the spray to remove stubborn refuse.

After a number of utensils have been treated in this manner, they are placed on the flip-up rack 104 within the sealable sterilizing chamber 62. When the chamber 62 is filled, door 64 is closed and live steam is introduced to the chamber via tubular spray 68 to sterilize the utensils therein. A hot or cold water rinse may also be introduced at any time to further remove any remaining refuse or to cool the utensils for immediate use. A manual mechanical timer 114 is used at the attendant's option to inform him when a cycle is completed. Although the timer 114 is mounted on the sterilizer station 60, in the preferred embodiment of the invention it may be incorporated in any of the other stations. A vent 116 is provided to release vapors to a vent pipe not shown.

Heretofore there has been disclosed an apparatus for washing and sterilizing cooking utensils such as pots and pans which is compact and overcomes the shortcomings of prior art systems. The stations may be used in any order and the number selected as required for each specific installation.

What I claim as new and desire to secure by Letters Patent is:

1. A pot and pan washer and sterilizer apparatus having several selectable stations arranged generally in a line from right to left and adapted to be connected to a source of hot and cold water and steam, comprising:

(a) soaking means including a first sink having hot water therein, for soaking said pots;

(b) a scraping station cooperating with and adjacent to, said soaking means including a V-shaped drain board inclined toward said sink for resting said pots and pans while being scraped by an attendant;

(c) washing means including a second sink, first and second fixed spray nozzles, a removable refuse tray and a recirculating pump for spraying hot water and recirculated water in response to attendant activated means for washing said pots and pans and accumulating said refuse; and (d) sterilizing means, having a sealable chamber with an access door, providing a steam spray in all directions within said chamber for sterilizing said pots and pans, said chamber further including drain means for removing condensing steam.

2. A washer and sterilizer apparatus according to claim 1 wherein said soaking means further includes within said first sink suitable means for draining said water and a removable perforated refuse basket occupying a portion of said first sink for accumulating refuse.

3. A washer and sterilizer apparatus according to claim 1 wherein said sterilizing station further includes timing means for controlling the length of time said steam is applied to said sterilizing chamber.

4. A pot washer and sterilizer apparatus according to claim 1 wherein said sterilizing means further includes perforated tubular piping arranged to spray steam, and hot and cold water throughout said chamber and having attached thereto a rotating swivel spray head to assist in distributing said water and steam throughout said chamber.

5. A pot and pan washer and sterilizer apparatus having several stations arranged generally in a line comprising:

(a) a soaking station, adapted to be connected to a source of hot and cold water, including a soaking sink having suitable means for draining fluids and further including therein a removable perforated refuse basket arranged to occupy a portion thereof;

(b) a scraping station, positioned adjacent to said soaking station and adapted to be connected to a source of hot and cold water, including a flexible and extendable spray head, a V-shaped drain board having an incline toward and cooperating with said removable refuse basket, for resting said pots and pans while being scraped by an attendant, a removable storage shelf for storing said pots and pans awaiting scraping and soaking, located beneath said drain board;

(c) a washing station, adapted to be connected to a source of hot and cold water, including a detergent dispenser adapted to automatically mix said source of hot water with said detergent and having an output port, a washing sink coupled to said detergent dispenser output port, having suitable means for draining fluids, agitating, and recirculating means, further including a first fixed spray nozzle for spraying said recirculated water, a second fixed spray nozzle for spraying hot water, both said nozzles being fixedly mounted in said sink, manually operated foot pedal means for activating said first and second spray nozzles in response to mechanical pressure provided by said attendant, a perforated refuse tray removably mounted beneath said first and second spray nozzles upon both sides of said washing sink, rack attached to said refuse tray for removing said tray for cleaning and suspending said pots and pans to be washed a fixed distance above said spray nozzles; and (d) a sterilizing station, adapted for connection to a source of live steam, having suitable means for draining fluids including a sealable sterilizing chamber having mounted therein a hinged lift up rack for supporting said pots and pans to be sterilized, and a second perforated refuse tray removably mounted within an opening in the bottom portion of said sterilizing chamber, said bottom opening thereof having permanently affixed thereto a basin for catching condensing steam and coupling said condensing steam to said drain means.

6. A washer and sterilizer apparatus according to claim 5 wherein said sterilizing station further includes timing means for controlling the length of time said steam is applied to said sterilizing chamber.

7. A washer and sterilizer apparatus according to claim 1 wherein said sterilizing station steam spray further includes perforated tubular piping arranged to spray steam and hot and cold water throughout said chamber and having attached thereto a rotating swivel spray head to assist in distributing said water and steam throughout said chamber.

8. A washer and sterilizer apparatus according to claim 7 wherein said tubular piping further includes a protective interlock valve having a water and steam shut-off activated when said access door is opened.

References Cited

UNITED STATES PATENTS

| 842,289 | 1/1907 | Woolverton | 134—84 |
| 1,198,974 | 9/1916 | Tremper | 134—95 UX |
| 2,121,361 | 6/1938 | Marran | 134—84 UX |
| 2,144,468 | 1/1939 | Suddarth | 134—90 |

FOREIGN PATENTS

| 517,858 | 1/1931 | Germany | 134—85 |
| 558,854 | 3/1957 | Italy | 134—88 |

ROBERT L. BLEUTGE, Primary Examiner

U.S. Cl. X.R.

134—89, 104